United States Patent
Liu et al.

(10) Patent No.: US 10,802,331 B2
(45) Date of Patent: Oct. 13, 2020

(54) DISPLAY APPARATUS AND CONTROL METHOD FOR POWER LOSS THEREOF

(71) Applicant: Wistron Corp., New Taipei (TW)

(72) Inventors: Cun Liu, New Taipei (TW); Xin Sheng Wen, New Taipei (TW); Jun Xin Qiu, New Taipei (TW); Yong Qiang Li, New Taipei (TW); Wen Long Yang, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/427,577

(22) Filed: May 31, 2019

(65) Prior Publication Data

US 2020/0233263 A1    Jul. 23, 2020

(30) Foreign Application Priority Data

Jan. 23, 2019   (CN) .......................... 2019 1 0064714

(51) Int. Cl.
   - G02F 1/13357    (2006.01)
   - G09G 3/3258     (2016.01)
   - G02F 1/133      (2006.01)
   - G06F 1/3234     (2019.01)

(52) U.S. Cl.
   CPC .... *G02F 1/133602* (2013.01); *G02F 1/13306* (2013.01); *G06F 1/3265* (2013.01); *G09G 3/3258* (2013.01)

(58) Field of Classification Search
   CPC ........... G02F 1/133602; G02F 1/13306; G06F 1/3265; G09G 3/3258
   USPC ......................................................... 345/102
   See application file for complete search history.

(56) References Cited

U.S. PATENT DOCUMENTS

| | | | |
|---|---|---|---|
| 6,121,962 A | * | 9/2000 | Hwang .................. G06F 1/3203 345/211 |
| 2011/0080266 A1 | * | 4/2011 | Rutman ............. G06K 7/10207 340/10.3 |
| 2017/0076657 A1 | * | 3/2017 | Lu ........................ G09G 3/2007 |

FOREIGN PATENT DOCUMENTS

| TW | 200847093 | * | 12/2008 | ............... G09G 3/18 |
|---|---|---|---|---|
| TW | 200847093 A | | 12/2008 | |

* cited by examiner

*Primary Examiner* — Chanh D Nguyen
*Assistant Examiner* — Derik John Trumble

(57) ABSTRACT

A display apparatus is provided. The display apparatus includes a display panel, a backlight module, a power-supply circuit, and a system-control circuit. The display panel is configured to display an image signal. The backlight module is configured to provide backlight to the display panel. The power-supply circuit is configured to convert an alternating current (AC) source to a direct current (DC) voltage. The system-control circuit includes a power-loss-detection circuit and a display controller. The power-loss-detection circuit is configured to detect whether the DC voltage from the power-supply circuit has a power-loss event. The display controller is configured to control the display panel and the backlight module. In response to the power-loss-detection circuit detecting that the DC voltage has the power-loss event, the display controller performs a predetermined shutdown procedure to sequentially turn off the backlight module and the display panel.

5 Claims, 4 Drawing Sheets

DISPLAY APPARATUS AND CONTROL METHOD FOR POWER LOSS THEREOF

CROSS REFERENCE TO RELATED APPLICATIONS

This Application claims priority of China Patent Application No. 2019100647414.1, filed on Jan. 23, 2019, the entirety of which is incorporated by reference herein.

BACKGROUND OF THE DISCLOSURE

Field of the Disclosure

The present disclosure relates to a display apparatus, and, in particular, to a display apparatus and a control method for power loss thereof.

Description of the Related Art

Currently, when a liquid-crystal display shuts down normally (e.g., DC power is turned off), power is still supplied to the control chip in the liquid-crystal display, and thus the firmware executed by the control chip is capable of turning off the backlight module and the display signal, and cutting power to the display panel using predetermined timing for a normal shutdown. However, if an AC power failure event (AC power down) occurs suddenly, the operating voltage of the control chip in the conventional liquid-crystal display will gradually decrease, After the operating voltage of the control chip reaches a point that is lower than the lowest value of the normal operating voltage, the control chip will stop working, and the firmware executed by the control chip does not have sufficient time to fit timing requirements of the predetermined normal shutdown procedure. In addition, after an AC power failure event has occurred, some display panels may not have sufficient time to discharge electric charges, resulting in charge residue on the display panel. AC power being resupplied to the display apparatus may have an impact on the gate driver of the display panel. If the AC power is repeatedly turned off and re-supplied, the display panel may display abnormally, and this may cause permanent damage to the display panel.

Accordingly, there is demand for a display apparatus and a control method for power loss to solve the aforementioned problem.

BRIEF SUMMARY OF THE DISCLOSURE

A detailed description is given in the following embodiments with reference to the accompanying drawings.

In an exemplary embodiment, a display apparatus is provided. The display apparatus includes a display panel, a backlight module, a power-supply circuit, and a system-control circuit. The display panel is configured to display an image signal. The backlight module is configured to provide backlight to the display panel. The power-supply circuit is configured to convert an alternating current (AC) voltage to a direct current (DC) voltage. The system-control circuit includes a power-loss-detection circuit and a display controller. The power-loss-detection circuit is configured to detect whether the DC voltage from the power-supply circuit has a power-loss event. The display controller is configured to control the display panel and the backlight module. In response to the power-loss-detection circuit detecting that the DC voltage has the power-loss event, the display controller performs a predetermined shutdown procedure to sequentially turn off the backlight module and the display panel.

In some embodiments, the power-loss detection circuit determines whether the DC voltage is lower than or equal to a trigger voltage, wherein in response to the DC voltage being lower than or equal to the trigger voltage, the power-loss-detection circuit outputs a power-loss-detection signal to indicate that the power-loss event has been detected.

In some embodiments, the power-loss-detection circuit includes a voltage-dividing circuit, a voltage-buffer circuit, a P-type transistor, and an output stage, wherein the voltage-dividing circuit converts the DC voltage into a first voltage, and the first voltage passes through a diode to generate a second voltage that is transmitted to the voltage-buffer circuit, wherein a gate, source, and drain of the P-type transistor are electrically connected to the DC voltage, the second voltage, and a gate of an N-type transistor of the output stage.

In some embodiments, the power-loss-detection circuit indicates a voltage at a drain of the N-type transistor of the output stage, wherein in response to there being a difference between the second voltage and the DC voltage that is greater than or equal to a threshold voltage of the P-type transistor, the P-type transistor is turned on to transmit the second voltage to a gate of the N-type transistor of the output stage, so that the N-type transistor is turned on and the power-loss-detection signal is changed from a high-logic state to a low-logic state.

In some embodiments, when the display controller is performing the predetermined shutdown procedure, the display controller sets a backlight-control signal to a low-logic state to turn off the backlight module at a first time point, stops sending the image signal to the display panel at a second time point, and disables a panel voltage provided to the display panel at a third time point, wherein the second time point is later than the first time point, and the third time point is later than the second time point.

In some embodiments, there is a first time interval between the second time point and the first time point that is greater than a predetermined time, and there is a second time interval between the third time point and the second time point that is within a predetermined time range. after the display controller has disabled the panel voltage provided to the display panel, the display controller waits for a delay time before resetting the display controller.

In another exemplary embodiment, a control method for power loss for use in a display apparatus is provided. The display apparatus includes a display panel, a backlight module, a power-supply circuit, and a power-loss-detection circuit. The method includes the following steps: utilizing the power-supply circuit to convert an alternating current (AC) source to a direct current (DC) voltage; utilizing the power-loss-detection circuit to detect whether the DC voltage from the power-supply circuit has a power-loss event; and in response to the power-loss-detection circuit detecting that the DC voltage has the power-loss event, performing a predetermined shutdown procedure to sequentially turn off the backlight module and the display panel.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

Figure 1:
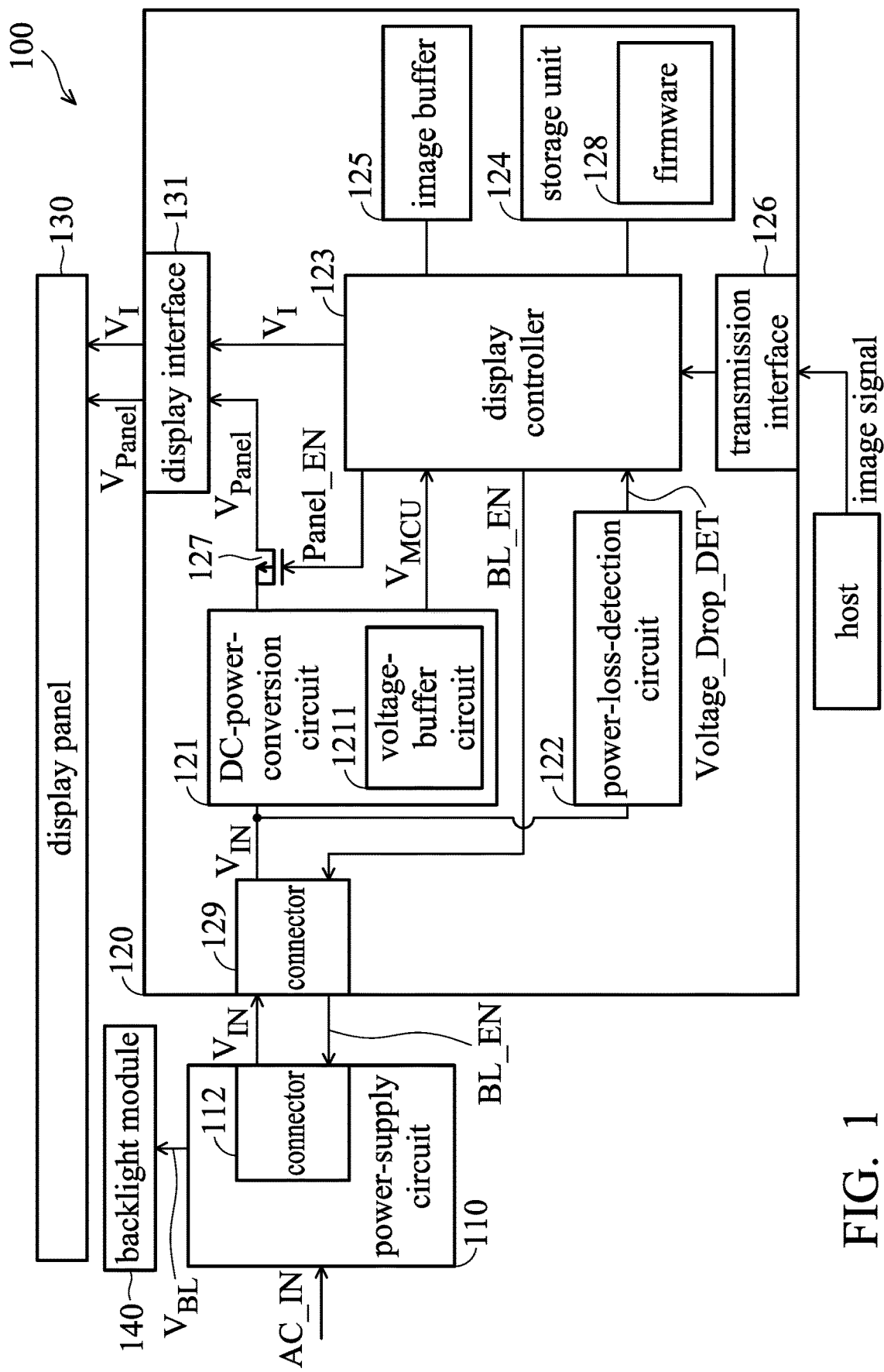
FIG. 1 is a block diagram of a display apparatus in accordance with an embodiment of the disclosure.

The following description is of the best-contemplated mode of carrying out the disclosure. This description is made for the purpose of illustrating the general principles of the disclosure and should not be taken in a limiting sense. The scope of the disclosure is best determined by reference to the appended claims.

It should be understood that the following disclosure provides one or more embodiments or examples to implement various features of the embodiments of the disclosure. The elements and arrangements of the specific examples disclosed below are intended to simplify the embodiments of the disclosure and are not intended to be limited to the examples. In addition, the features in the drawings are not drawn to scale and are for illustrative purposes only.

FIG. 1 is a block diagram of a display apparatus in accordance with an embodiment of the disclosure. The display apparatus 100, for example, may be a flat display, a television, a projector, a computer monitor, or the like, but the disclosure is not limited thereto.

As depicted in FIG. 1, the display apparatus 100 may include a power-supply circuit 110, a system-control circuit 120, a display panel 130, and a backlight module 140. The power-supply circuit is configured to receive an alternating current (AC) power source AC_IN, and convert the AC power source AC_IN to a direct current (DC) voltage $V_{IN}$. The power-supply circuit 110 may provide the DC voltage $V_{IN}$ to the system-control circuit 120 via a connector 112. In addition, the power-supply circuit 110 may further convert the AC power source AC_IN to a DC voltage $V_{BL}$ that is provided to the backlight module 140 (e.g., may be a light-emitting diode (LED) driver, so that the power-supply circuit 110 may control the backlight function of the backlight module 140 according to an backlight-control signal BL_EN from the system-control circuit 120.

The system-control circuit 120 is configured to control the display panel 130 of the display apparatus 100 to display an image signal from a host (not shown), and control activation or deactivation of the backlight function of the backlight module 140. In addition, the system-control circuit 120 may detect whether a power-loss event occurs. In response to a power-loss event, the system-control circuit 120 may deactivate the backlight function of the backlight module 140 according to a predetermined shutdown procedure, such as first disabling the image signal to the display panel 130, and then disabling the panel voltage $V_{Panel}$. The details are described below.

The display panel 130, for example, may be a liquid-crystal display panel, a light-emitting diode (LED panel, an organic light-emitting diode (OLED) panel, but the disclosure is not limited thereto.

The system-control circuit 120 may include a DC-power-conversion circuit 121, a power-loss-detection circuit 122, a display controller 123, a storage unit 124, an image buffer 125, and a transmission interface 126. The connector 129 is electrically connected to the connector 112 of the power-supply circuit 110, and the DC-power-conversion circuit 121 may receive the DC voltage $V_{IN}$ from the power-supply circuit 110 via the connector 129, and convert the DC voltage $VI_N$ to the panel voltage $V_{Panel}$ and the controller voltage $V_{MCU}$. The panel voltage $V_{Panel}$ is provided to the display panel 130 via the switch circuit 127, wherein the display controller 123 may output a display-voltage-control signal Panel_EN to control activation and deactivation of the switch circuit 127. The controller voltage $V_{MCU}$ output by the DC-power-conversion circuit 121 is provided to the display controller 123 for use as the operating voltage of the display controller 123.

The power-loss-detection circuit 122 is configured to detect whether the DC voltage $V_{IN}$ from the power-supply circuit 110 is lower than a trigger voltage, and output a power-loss-detection signal Voltage_Drop_DET to the display controller 123.

The display controller 123, for example, may be an application-specific integrated circuit (ASIC), a system-on-chip (SoC), a processor, or a microcontroller, but the disclosure is not limited thereto.

The storage unit 124, for example, may be a non-volatile memory such as a read-only memory (ROM), an erasable programmable read-only memory (EPROM), an electrically erasable programmable read-only memory (EEPROM), but the disclosure is not limited thereto. The storage unit 124 is configured to store firmware 128 associated with the display apparatus 100. The storage unit 124, for example, can be disposed outside the display controller 123, or integrated into the display controller 123. The firmware 128, for example, may include display configurations, extended display identification data (EDID), and the predetermined shutdown procedure of the display apparatus 100. The EDID, for example, may include information about the manufacturer, product name, resolution, frames per second (fps) of the display apparatus 100. The display configurations, for example, may include the brightness, contrast, sharpness, color temperature of the display apparatus 100. In an embodiment, the display controller 123 may read the firmware 128 stored in the storage unit 124 via a bus (e.g., an I2C bus), thereby setting corresponding display configurations.

The transmission interface 126, for example, may include one or more wired transmission interfaces, wherein the wired transmission interfaces may include the High Definition Multimedia Interface (HDMI), DisplayPort interface, embedded DisplayPort (eDP) interface, Universal Serial Bus (USB) interface, USB Type-C interface, Thunderbolt interface, digital-video interface (DVI), video graphics array (VGA) interface, general-purpose input/output (GPIO) interface, universal asynchronous receiver/transmitter (UART) interface, serial peripheral interface (SPI), Inter-integrated circuit (I2C) interface, or a combination thereof, but the disclosure is not limited thereto.

The display controller 123 may receive an image signal from a host through the transmission interface 126, and perform an image-scaling process on the image signal to generate an output image signal complying with the resolution of the display panel 130, and store the output image signal in the image buffer 1231. In addition, the display controller 123 may transmit the output image signal stored in the image buffer 125 to the display panel for displaying via a display interface (e.g., an LVDS interface).

In an embodiment, the display controller 123 may determine whether a power-loss event has occurred according to the power-loss-detection signal Voltage_Drop_DET from the power-loss-detection circuit 122. In response to the power-loss-detection signal Voltage_Drop_DET being in the high-logic state, the display controller 123 may determine that no power-loss event has occurred. In response to the power-loss-detection signal Voltage_Drop_DET being in the low-logic state, the display controller 123 may determine that a power-loss event has occurred, and may immediately execute the predetermined shutdown procedure in the firmware 128 to sequentially turn off power to the backlight module 140, disabling the image signal to the display panel, and turning off power to the display panel 130.

Figure 2:
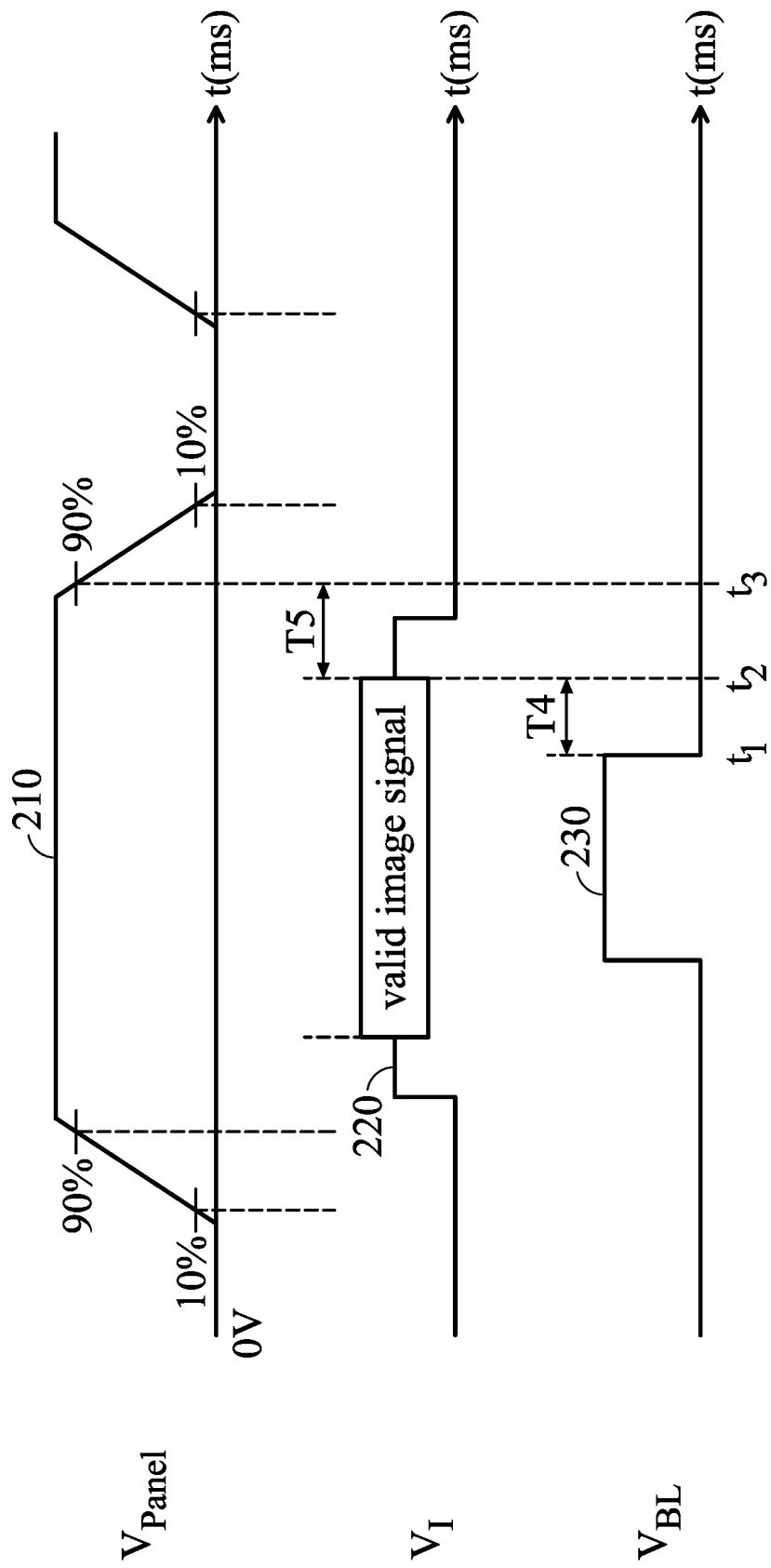
FIG. 2 is a timing diagram of the predetermined shutdown procedure in accordance with an embodiment of the disclosure.

FIG. 2 is a timing diagram of the predetermined shutdown procedure in accordance with an embodiment of the disclosure.

Referring to FIG. 1 and FIG. 2, in an embodiment, there are two main timing requirements of the predetermined shutdown procedure of the display apparatus 100: (1) the backlight of the display panel needs to be turned off prior to disabling the display signal, and the advance time (e.g., time interval T4) needs to be greater than a predetermined time, such as 200 ms, so as to avoid noises being displayed on the display panel while the display apparatus is being turned off; (2) the display signal to the display panel 130 needs to be disabled before turning off power to the display panel, and the advance time (e.g., time interval T5) needs to be within a predetermined time range, such as 0.01 ms<T5<50 ms, so as to avoid a situation wherein the residual charge of the display panel 130 cannot be fully discharged in time when the display apparatus 100 is being turned off, resulting in an abnormal display.

For example, curve 230 indicates the relationship of the power signal $V_{BL}$ of the backlight module 140 with respect to time. Curve 220 indicates the relationship of the image signal $V_1$ displayed by the display panel 130 with respect to time. Curve 210 indicates the relationship of the panel voltage $V_{Panel}$ of the display panel 130 with respect to time.

During the predetermined shutdown procedure of the display apparatus 100, at time t1, curve 230 is in a negative-edge transition (i.e., a transition from the high-logic state to the low-logic state), and this indicates that the power signal $V_{BL}$ of the backlight module 140 has been turned off by the display panel 123. For example, the display controller 123 may generate the backlight-control signal BL_EN to control activation and deactivation of the backlight module 140. The backlight-control signal BL_EN generated by the display controller 123 being in the high-logic state indicates that the backlight function of the backlight module 140 is activated. The backlight-control signal BL_EN generated by the display controller 123 being in the low-logic state indicates that the backlight function of the backlight module 140 is deactivated.

At time t2, the display controller 123 stops sending the display signal VI to the display panel 130. In order to satisfy the time requirements of the predetermined shutdown procedure, the time interval T4=t2−t1 needs to be greater than the predetermined time interval (e.g., 200 ms).

In addition, at time t3, the panel voltage $V_{Panel}$ is decreased from 100% to 90% of the normal operating voltage. In order to satisfy the time requirements of the predetermined shutdown procedure, the time interval T5=t3−t2 needs to be within the predetermined time range, such as 0.01 ms<T5<50 ms.

In the aforementioned embodiment, the predetermined shutdown procedure of the display apparatus 100 during the normal shutdown is mainly described, and generally the display 123 turns off the DC power to the backlight module and the display panel 130, but the AC power to the display apparatus 100 has not been cut off. However, if an AC-power-loss event has occurred, since the power supply to the display apparatus itself is cut off, the conventional display apparatus can only wait until the remaining charge of the internal circuit is discharged and automatically shuts down, thereby failing to meet the timing requirements of the display panel. On the contrary, the display apparatus 100 in the embodiments of the disclosure is capable of detecting occurrence of an AC-power-loss event in advance, so that there is sufficient time to complete the predetermined shutdown procedure.

Figure 3:
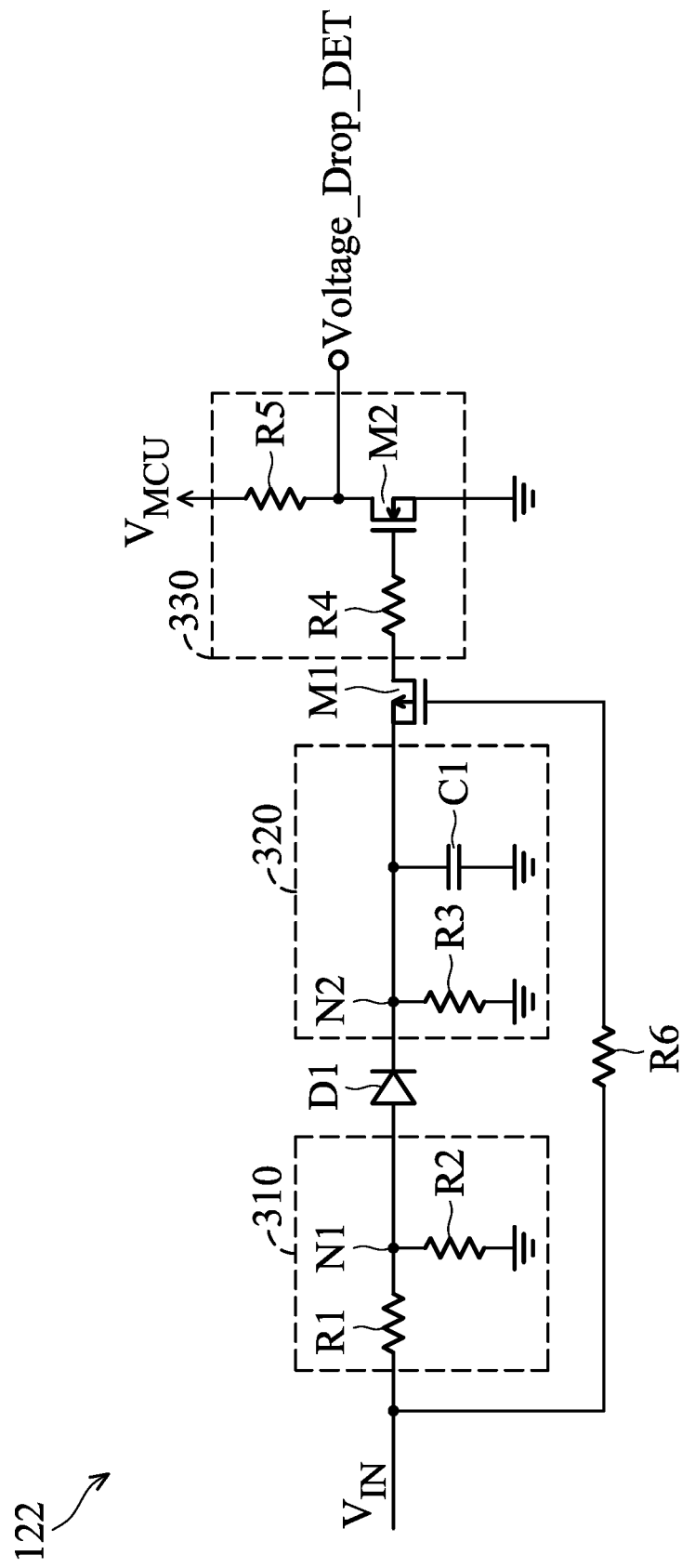
FIG. 3 is a schematic diagram of the power-loss-detection circuit in accordance with an embodiment of the disclosure.

FIG. 3 is a schematic diagram of the power-loss-detection circuit in accordance with an embodiment of the disclosure.

In an embodiment, the power-loss-detection circuit 122 may detect whether the DC voltage $V_{IN}$ from the power-supply circuit 110 is lower than a trigger voltage $V_{Trigger}$. In response to the power-loss-detection circuit 122 detecting that the DC voltage $V_{IN}$ from the power-supply circuit 110 is lower than the trigger voltage $V_{Trigger}$, the power-loss-detection signal Voltage_Drop_DET generated by the power-loss-detection circuit 122 is changed from the high-logic state to the low-logic state. For example, the power-loss-detection circuit may include a voltage-dividing circuit 310, a voltage-buffer circuit 320, and an output stage 330.

When the AC power source AC_IN is steadily provided to the power-supply circuit 110, the DC voltage $V_{IN}$ generated by the power-supply circuit 110 is a fixed voltage such as 19V. The DC voltage $V_{IN}$ is divided by the voltage-dividing circuit 310, and the voltage $V_{N1}$ at node N1 can be expressed as $V_{N1}=V_{IN}*R2/(R1+R2)$. The voltage $V_{N1}$ at node N1 is reduced by the forward bias voltage $V_{D1}$ of the diode D1 to obtain the voltage $V_{N2}$ at node N2, and thus the voltage $V_{N2}$ at node N2 can be expressed as: $V_{N2}=V_{N1}-V_{D1}$.

The voltage-buffer circuit 320 may be an RC charging and discharging circuit, and the capacitor C1 of the voltage-buffer circuit 320 may store the voltage $V_{N2}$ when the AC power source AC_IN is steadily supplied (i.e., steady state). Since the voltage across the voltage-buffer circuit 320 does not change instantaneously, the DC voltage $V_{IN}$ generated by the power-supply circuit 110 will drop after the AC-power-loss event has occurred. However, because the voltage-buffer circuit 320 will gradually discharge, the P-type transistor M1, the voltage of the source (i.e., the voltage $V_{N2}$ at node N2) will drop slower than the voltage of the gate (i.e., electrically connected to the DC voltage $V_{IN}$ through the resistor R6). Accordingly, the voltage difference $V_{GS}$ between the gate and source of the P-type transistor M1 is rapidly increased, so that the voltage difference $V_{GS}$ is greater than the threshold voltage Vt of the P-type transistor M1. At this time, the P-type transistor M1 is turned on. When the P-type transistor M1 is turned on, the voltage $V_{N2}$ at node N2 will be transmitted to the gate of the N-type transistor M2 in the output stage 330, such that the N-type transistor M2 is turned on, thereby causing the power-loss-detection signal Voltage_Drop_DET to be changed from the high-logic state (e.g., the voltage VMCU) to the low-logic state (e.g., ground).

Accordingly, the trigger voltage $V_{Trigger}$ of the power-loss-detection circuit 122 can be expressed by equation (1):

$$V_{Trigger} = V_{IN} \frac{R2}{R1+R2} - V_{D1} - V_t \qquad (1)$$

That is, when the DC voltage $V_{IN}$ generated by the power-supply circuit 110 is decreased to the trigger voltage $V_{Trigger}$, the power-loss-detection signal Voltage_Drop_DET output by the power-loss-detection circuit 122 is changed from the high-logic state to the low-logic state, thereby indicating that a power-loss event has detected. It should be noted that the power-loss-detection signal Voltage_Drop_DET output by the power-loss-detection circuit 122 is detected by the interrupt I/O pins of the display controller 123 in real time, and thus the power-loss-detection signal Voltage_Drop_DET can be regarded as an interrupt signal of the display controller 123, so that the display controller 123 may rapidly perform the predetermined shutdown procedure. In some embodiments, general I/O pins of the display controller 123 are used to detect the power-loss-detection signal Voltage_Drop_DET, and the firmware 128 includes the interrupting procedure using the power-loss-detection signal Voltage_Drop_DET.

Specifically, there is a voltage-buffer circuit 1211 in the DC-power-conversion circuit 121, and the voltage-buffer circuit 1211 may also be the enable-control circuit of the DC-power-conversion circuit 121, which is capable of adjusting the voltage of the shutdown state to delay the shutdown time of the DC-power-conversion circuit. When an AC-power-loss event has occurred, the design of the voltage-buffer circuit 1211 may provide sufficient voltage $V_{MCU}$ to the display controller 123 until the predetermined shutdown procedure has completed.

Figure 4:
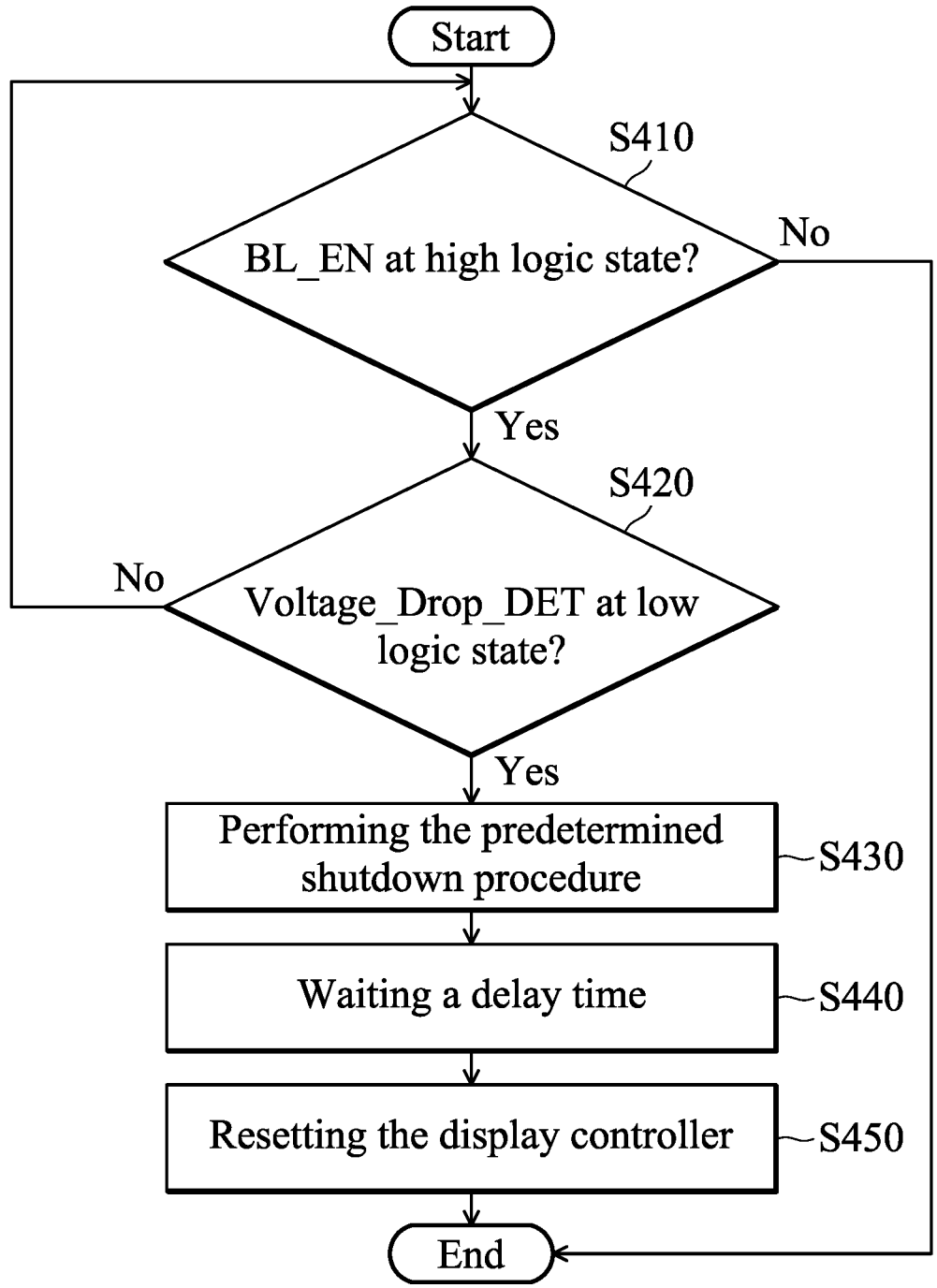
FIG. 4 is a flow chart of a control method of power loss in accordance with an embodiment of the disclosure.

FIG. 4 is a flow chart of a control method of power loss in accordance with an embodiment of the disclosure.

Referring to FIG. 1, FIG. 2, and FIG. 4, in step S410, it is determined whether the backlight-control signal BL_EN is in the high-logic state. If the backlight-control signal BL_EN is in the high-logic state, step S420 is performed. If the backlight-control signal BL_EN is in the low-logic state, the flow ends. For example, when the backlight-control signal BL_EN is in the low-logic state, the display apparatus 100 is in the shutdown state, and the power-loss-detection circuit 122 is not activated. When the backlight-control signal BL_EN is in the high-logic state, this means that the display apparatus 100 is in the working state, and the power-loss-detection circuit 122 has been activated.

In step S420, it is determined whether the power-loss-detection signal Voltage_Drop_DET generated by the power-loss-detection circuit is in the low-logic state. When it is determined that the power-loss-detection signal Voltage_Drop_DET is in the low-logic state, step S430 is performed. When it is determined that the power-loss-detection signal Voltage_Drop_DET is in the low-logic state, step S410 is performed. For example, when the power-loss-detection signal Voltage_Drop_DET is in the high-logic state, this means that the power-loss-detection circuit 122 does not detect a power-loss event, and the display controller 123 still has to constantly monitor the logic state of the power-loss-detection signal Voltage_Drop_DET generated by the power-loss-detection circuit 122.

In step S430, the predetermined shutdown procedure is performed. For example, in the predetermined shutdown procedure, the display controller 123 may sequentially turn off power to the backlight module 140, disabling the image signal to the display panel, and turning off power to the display panel 130. In response to the power-loss-detection signal Voltage_Drop_DET being in the low-logic state, the display controller 123 may follow the timing defined in the predetermined shutdown procedure to first turn off the backlight module 140 (e.g., setting the backlight-control signal BL_EN to the low-logic state), and the stop sending the image signal $V_1$ to the display panel 130, and the time interval between these two operations should be greater than the predetermined time interval T4 such as 200 ms. In addition, when the display controller 123 is turning off power to the display panel 130, the time interval T5 between time point t3 at which the panel voltage $V_{Panel}$ drops to 90% of the operating voltage and time point t2 at which the transmission of the image signal $V_1$ to the display panel 130 is stopped is required to be within the predetermined time range, such as 0.01 ms<T5<50 ms.

In step S440, a delay time is waited. For example, the time interval T5 may indicate the time interval between time point t3 at which the panel voltage $V_{Panel}$ drops to 90% of the operating voltage and time point t2 at which the transmission of the image signal $V_1$ to the display panel 130 is stopped. However, a delay time is still needed for the panel voltage $V_{Panel}$ to be lowered to 0V (i.e., fully discharged).

In step S450, the display controller 123 is reset. For example, when the aforementioned predetermined shutdown procedure has been performed, the display controller 123 will reset its own display configurations to respond to the power-loss event.

In view of the above, a display apparatus and a control method for power loss thereof are provided. The display apparatus and the control method are capable of rapidly detecting whether an AC-power-loss event occurs using the power-loss-detection circuit, and the display controller is capable of performing the predetermined shutdown procedure to sequentially turn off the backlight module and display panel of the display apparatus, and the predetermined shutdown procedure meets the timing requirements of the display panel when the display panel is being turned off, so that the gate driver circuit of the display panel has sufficient time to fully discharge, thereby achieving the function of protection the display panel when a power-loss event occurs.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display apparatus, comprising:
   a display panel, configured to display an image signal;
   a backlight module, configured to provide backlight to the display panel;
   a power-supply circuit, configured to convert an alternating current (AC) voltage to a direct current (DC) voltage; and
   a system-control circuit, comprising:
      a power-loss-detection circuit, configured to detect whether the DC voltage from the power-supply circuit has a power-loss event; and
      a display controller, configured to control the display panel and the backlight module,
   wherein in response to the power-loss-detection circuit detecting that the DC voltage has the power-loss event, the display controller performs a predetermined shutdown procedure to sequentially turn off the backlight module and the display panel, wherein the power-loss detection circuit determines whether the DC voltage is lower than or equal to a trigger voltage, wherein in response to the DC voltage being lower than or equal to the trigger voltage, the power-loss-detection circuit outputs a power-loss-detection signal to indicate that the power-loss event has been detected, wherein the power-loss-detection circuit comprises a voltage-dividing circuit, a voltage-buffer circuit, a P-type transistor, and an output stage, wherein the voltage-dividing circuit converts the DC voltage into a first voltage, and the first voltage passes through a diode to generate a second voltage that is transmitted to the voltage-buffer circuit, wherein a gate, source, and drain of the P-type transistor are respectively electrically connected to the DC voltage, the second voltage, and a gate of an N-type transistor of the output stage.

2. The display apparatus as claimed in claim 1, wherein the power-loss-detection circuit indicates a voltage at a drain of the N-type transistor of the output stage, wherein in response to there being a difference between the second voltage and the DC voltage that is greater than or equal to a threshold voltage of the P-type transistor, the P-type transistor is turned on to transmit the second voltage to a gate of the N-type transistor of the output stage, so that the N-type transistor is turned on and the power-loss-detection signal is changed from a high-logic state to a low-logic state.

3. The display apparatus as claimed in claim 1, wherein when the display controller is performing the predetermined shutdown procedure, the display controller sets a backlight-control signal to a low-logic state to turn off the backlight module at a first time point, stops sending the image signal to the display panel at a second time point, and disables a panel voltage provided to the display panel at a third time point, wherein the second time point is later than the first time point, and the third time point is later than the second time point.

4. The display apparatus as claimed in claim 3, wherein there is a first time interval between the second time point and the first time point that is greater than a predetermined time, and there is a second time interval between the third time point and the second time point that is within a predetermined time range.

5. The display apparatus as claimed in claim 3, wherein after the display controller has disabled the panel voltage provided to the display panel, the display controller waits for a delay time before resetting the display controller.

* * * * *